No. 878,575. PATENTED FEB. 11, 1908.
I. STEVENSON & J. COOK.
ORE DREDGING AND SEPARATING APPARATUS.
APPLICATION FILED DEC. 31, 1906.

4 SHEETS—SHEET 1.

WITNESSES
W. P. Burke
Alvin E. White

INVENTORS
Isaac Stevenson
John Cook

No. 878,575. PATENTED FEB. 11, 1908.
I. STEVENSON & J. COOK.
ORE DREDGING AND SEPARATING APPARATUS.
APPLICATION FILED DEC. 31, 1906.

4 SHEETS—SHEET 2.

WITNESSES

INVENTORS
Isaac Stevenson
John Cook

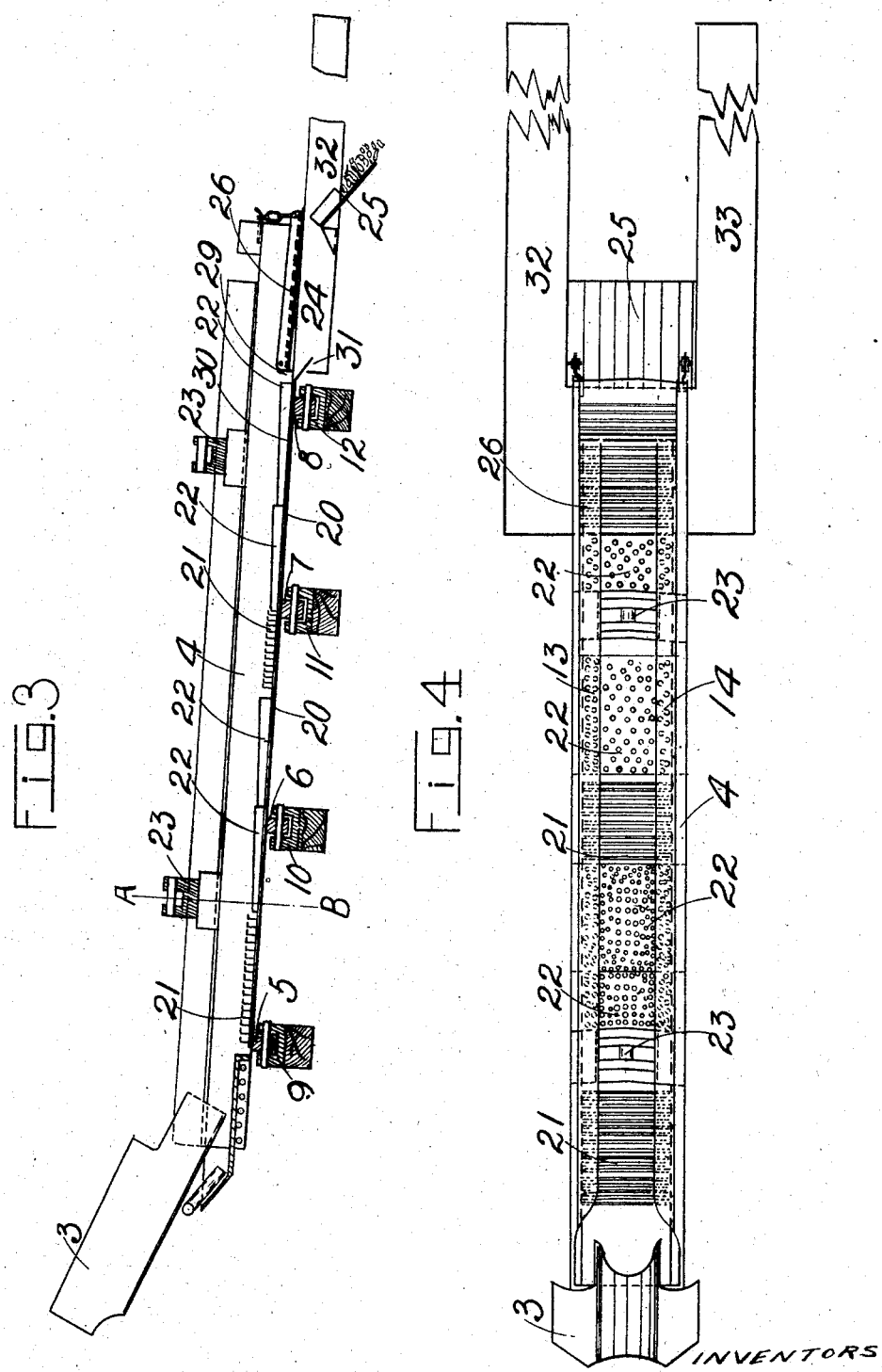

No. 878,575. PATENTED FEB. 11, 1908.
I. STEVENSON & J. COOK.
ORE DREDGING AND SEPARATING APPARATUS.
APPLICATION FILED DEC. 31, 1906.

4 SHEETS—SHEET 4.

WITNESSES
W. P. Burk
Alvin G. White

INVENTORS
Isaac Stevenson
John Cook

UNITED STATES PATENT OFFICE.

ISAAC STEVENSON AND JOHN COOK, OF PORT CHALMERS, NEW ZEALAND.

ORE DREDGING AND SEPARATING APPARATUS.

No. 878,575.        Specification of Letters Patent.        Patented Feb. 11, 1908.

Application filed December 31, 1906. Serial No. 350,249.

*To all whom it may concern:*

Be it known that we, ISAAC STEVENSON and JOHN COOK, both of Port Chalmers, New Zealand, engineers, have invented certain new and useful Improvements in Ore Dredging and Separating Apparatus, of which the following is a specification.

Our invention relates particularly to dredging operations for recovering gold and other valuables and the object of our invention is to treat the material dredged up so as to separate the stones from the fine gravel and silt, save the gold or other valuables, discharge the stones first and then deposit the fine gravel and silt on top of them and some distance beyond the place the stones are being tipped thereby leaving the ground that has been worked in a fit state for cultivation no gravel larger than the size of peas being mixed with the soil or silt. By adjustment hereinafter described it can be arranged that nothing but sand and soil is spread on the top of the coarse material. This method is superior to the ordinary method of working in as much as by it the worked land is left little the worse of the process and may be used for fruit and other farming or the like as before.

The leading feature of the invention is the rocking sluice box for the objects before described and the subsidiary features are hereinafter described and are more particularly pointed out in the claims.

In the accompanying drawings illustrating our invention as applied to a gold dredge the same reference numbers indicate the same or similar parts.

Figure 1:
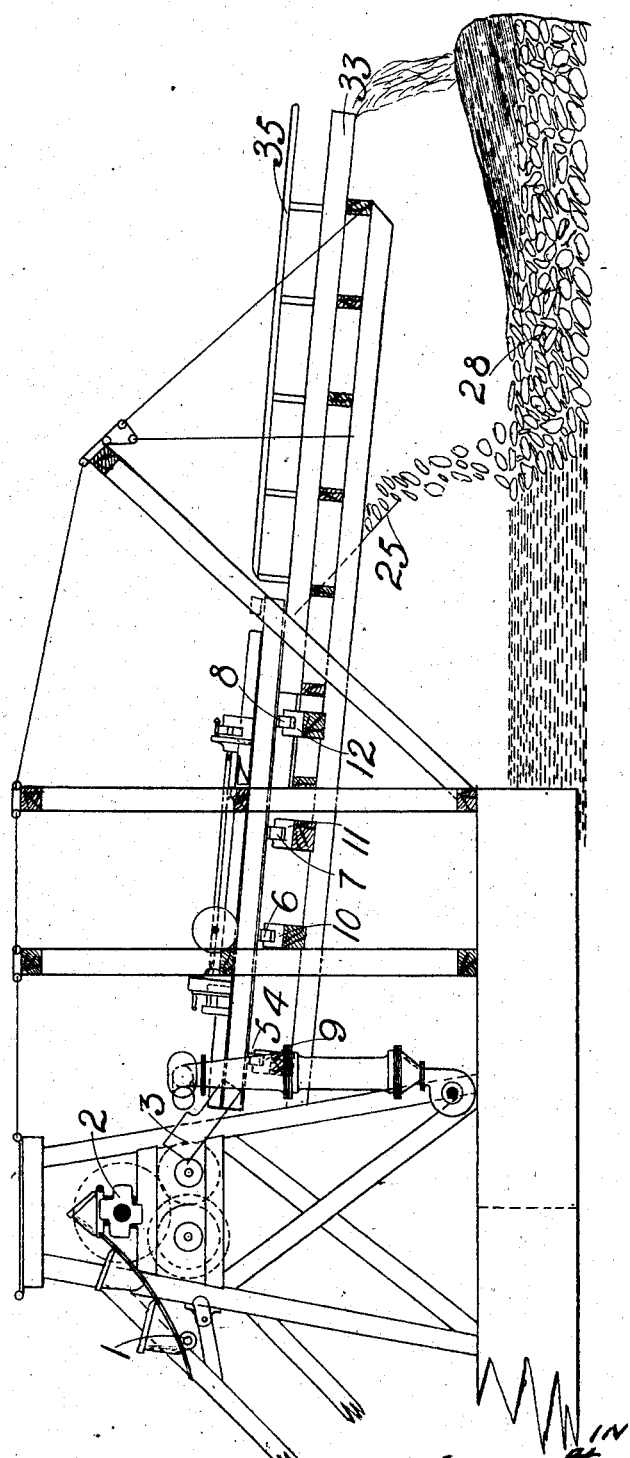
Figure 2:
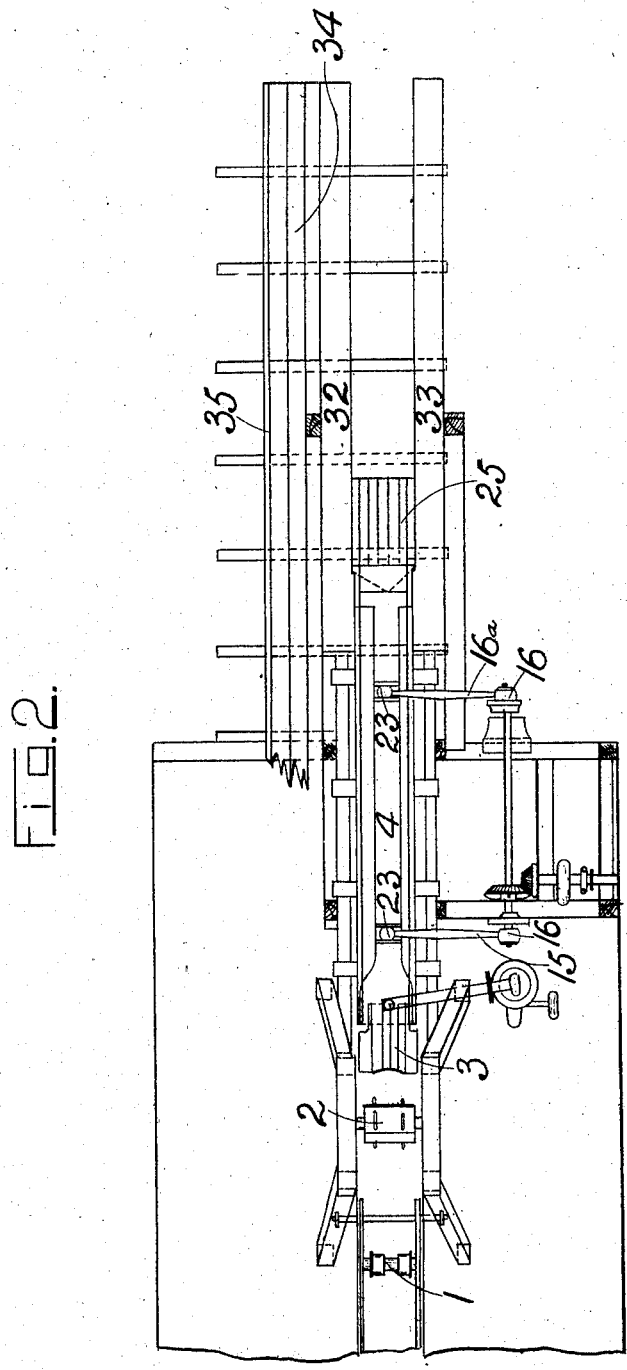
Figure 5:
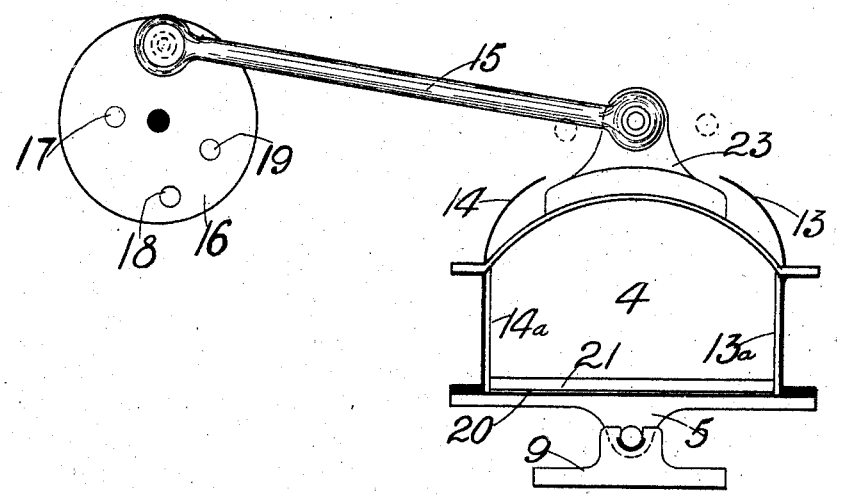
Figure 6:
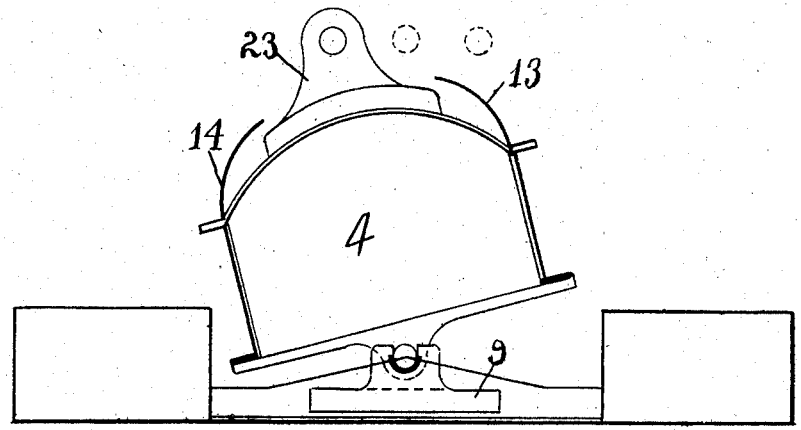

Figure 1 is a side view of part of a dredge showing the invention in position. Fig. 2 is a plan of same. Fig. 3 is a sectional elevation of our invention showing details. Fig. 4 is a plan of same. Fig. 5 is an enlarged cross sectional view on the line A. B. of Fig. 3, and also shows the connection to disk crank. Fig. 6 is a section showing the limit of travel of the rocker and also the silt chutes.

The dredged material is raised by buckets up the dredge ladder (1) and tipped over the top tumbler (2) into the drop chute (3) as usual whence it is delivered into the upper end of the rocking sluicebox (4) and is washed down by water supplied in the usual way by pumps or pressure. The rocking sluice box (4) is preferably rectangular in cross section for cheapness of construction as shown in Figs. 5 and 6 and is provided with a series of rockers (5) (6) (7) (8) which are pivoted in brackets (9) (10) (11) (12) suitably supported. The rocking sluice box is also provided with splash plates (13) (14) one on each side for the purpose of preventing the contents from washing over the edges and with sheathing or wearing plates (13$^a$) (14$^a$) to prevent the wearing out of the sides by the motion of the stones.

A pair of connecting rods (15) and (16$^a$) each pivoted at one end to a bracket (23) suitably supported above the middle of the stone chute and at the other end eccentrically to disk cranks (16) form the means, on the revolution of the disk cranks by bevel gear and belting (see Fig. 2) from the usual dredge machinery, for rocking the sluice box. Holes (17) (18) (19) are provided on the disk cranks for the purpose of altering the pivotal connection of the connecting rods thereto so that the travel of the sluice box may be increased or diminished as required by the circumstances of the case. The sluice box is provided with calico and matting (20) on the bottom to save and hold the gold and above these a series of riffles (21) are arranged alternately with a series of perforated plates (22). At the lower end of the sluice box is a stationary grating (26) pivoted at its upper end and supported by a chain or the like at its lower end so that its inclination may be adjusted to facilitate the descent of the stones onto a tail chute (25) whence they are discharged by themselves into a heap (28) as shown in Fig. (1). The silt and fine gravel fall through an opening (29) between the lowermost perforated plate (30) and the grating (26) into the transverse compartment (24) guided by the guide plate (31) and thence flow at both sides into the silt chute (32) and (33) placed one on each side of the grating and extending beyond same so as to deliver the silt and fine gravel beyond the stones and on them as shown in Fig. 1. A platform (34) provided with a hand rail (35) runs along side the silt chutes.

In order to enable only sand and soil to be deposited on the stones, the perforated plates and in particular the lowermost one (30) may have finer perforations so that the large particles pass out over the grating (26) with the stones.

It will thus be seen that the invention acts as a sluice box, with a rocking motion capable of treating material on a large scale. The application of the invention to dredges provided with elevators and to sluicing operations where power is available to rock the chute is obvious.

By our invention the labor usually required to remove the stones is saved and less water is required for washing the spoil—it is also cheap in construction and effective in operation above usual means.

Having now described our invention, what we claim as new and desire to secure by Letters Patent, is:

In combination a dredge support, excavating means thereon, a chute adapted to receive the material directly from the excavating means, a rocking sluice box adapted to receive the material directly from the chute, said box having means for delivering the heavy tailings at the end thereof, and for delivering fine tailings intermediate its ends and separate run-ways for catching said fine material and distributing it on the top of and beyond the heavy tailings and adjustable means for rocking the sluice box transversely.

In testimony whereof we have signed our names to this specification in the presence of two subscribing witnesses.

ISAAC STEVENSON.
JOHN COOK.

Witnesses:
ANDREW JOHN PARK,
ROBERT CHRISTOPHER PARK.